July 12, 1949.  M. E. BROWN  2,475,942
VARIABLE FIELD MECHANISM FOR VIEW FINDERS
Filed April 3, 1948
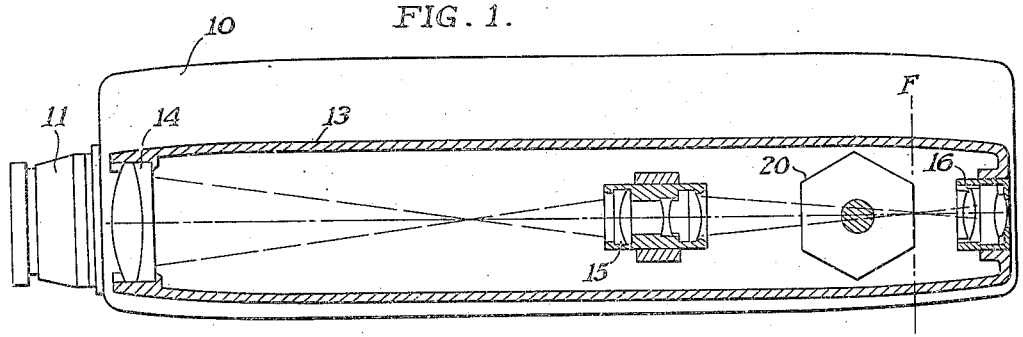
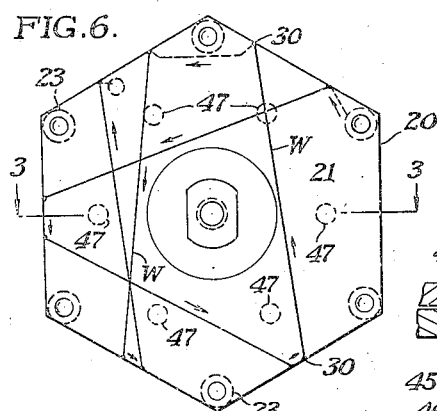
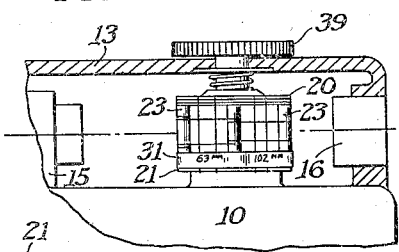
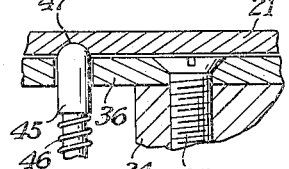
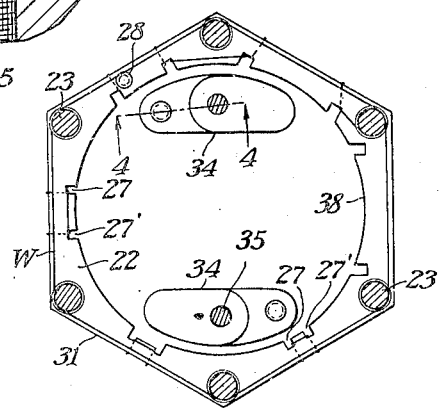
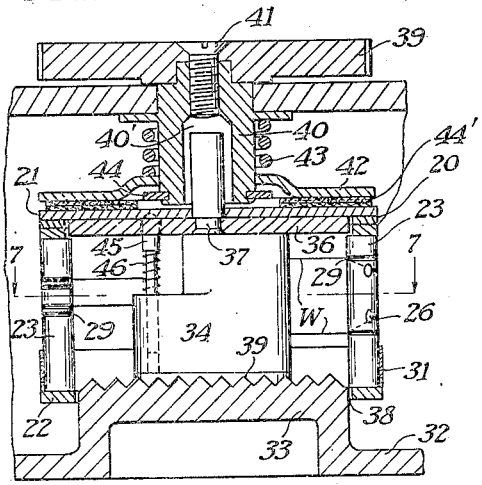
MORRIS E. BROWN
INVENTOR
ATTORNEYS Patented July 12, 1949

2,475,942

UNITED STATES PATENT OFFICE 2,475,942

VARIABLE FIELD MECHANISM FOR VIEW FINDERS

Morris E. Brown, Rochester, N. Y., assignor to Eastman Kodak Company, Rochester, N. Y., a corporation of New Jersey Application April 3, 1948, Serial No. 18,778

9 Claims. (Cl. 33—64)

This invention relates to an optical view finder system for use on cameras adapted to use interchangeable lenses of different focal length, and, particularly to a variable field mechanism by means of which the finder field can be adjusted to correspond to the field of lenses of different focal lengths.

One object of the present invention is the provision of a camera view finder having a novel variable field mechanism by means of which a field corresponding to lenses of different focal lengths can be readily obtained.

Another object is to provide a variable field mechanism which is so designed that the maximum amount of light is admitted to the ocular even when using the field masks which correspond to the longer focal length lenses.

And, another object is to provide a variable field mask assembly which is simple in construction, efficient in operation, and capable of being readily adjusted in accordance with lenses of different focal length by adjustment of a knob outside of the finder housing.

And, another object is to provide a variable field mask assembly which includes a plurality of field frames of different sizes arranged in a compact and novel manner so that they require little or no increase in the dimensions of conventional finder casings for their use and in which each mask includes an identifying legend which is visible in the ocular of the finder along with the mask itself.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a top plan view partly in section of a motion picture camera equipped with a view finder including a variable field mechanism constructed in accordance with a preferred embodiment of the present invention;

Fig. 2 is a vertical sectional detail through a part of the finder system and showing the variable field mask assembly, its location in the finder system, and its method of adjustment;

Fig. 3 is an enlarged vertical section taken substantially on line 3—3 of Fig. 6 and showing the method of mounting the variable field mask assembly in the finder housing;

Fig. 4 is a sectional detail showing the spring-loaded detent for locating the mask assembly in its several positions of adjustment;

Fig. 5 is a developed view of the mask assembly, as shown in Fig. 6, and showing the method of wrapping the wire around the frame to form the different size field frames, or masks;

Fig. 6 is a top plan view of the mask assembly showing how the wire is wrapped over the top of the polygonal frame to provide the vertical boundaries of the masks; and Fig. 7 is a sectional view taken substantially on line 7—7 of Fig. 3.

Like reference characters refer to corresponding parts throughout the drawings.

Briefly, the present invention relates to a view finder for a camera which is adapted to receive interchangeable objectives of different focal length, said view finder including a variable field mask assembly in the form of a polygonal drum rotatably mounted in the finder system so that masks of different sizes in the several walls of the drum may be moved into operative position in the finder system. The drum is so located in the finder system that despite the fact that two masks are always located in the system at all times, only one of them is in focus in the ocular and the masks are of such a nature that the one located in the system and not being used does not cut down the light passing to the operative mask and the ocular of the finder. The mask assembly itself is so fabricated that the four boundaries of each of the plurality of masks are formed from a single continuous wire wrapped in a particular way on the polygonal drum.

I am aware that camera view finders have been proposed in which the variable field mechanism comprises a rotatable tube having diametrically spaced windows of different sizes which may be moved into the view finder system in succession by rotation of the drum. This type of variable field mechanism has the disadvantage that the masks are opaque so that when the smaller masks, corresponding to the longer focal length camera objectives, are in place, too little light reaches the eye and it is difficult to bring the desired subject into, or catch it in, the field, particularly if the subject is moving. Furthermore, the use of such a variable field mechanism requires the proper location of non-interfering masks in opposite relation in order to function, thus preventing the masks from being located on the drum in succession according to size.

Referring now to the drawings, 10 designates generally a motion picture camera, on the front wall of which different objectives 11 may be interchangeably mounted in a known manner. On the top wall of the camera there is mounted an optical view finder which is enclosed in a substantially rectangular casing or conduit 13 extending substantially the full length of the camera. The finder system may include an objective 14, an erecting lens 15, and an ocular 16; the objective and erecting lens, in combination, forming an erect image of the subject at the focal plane F—F and the ocular being focused on said focal plane. In order to define the size of the field of view corresponding to the focal length objective being used on the camera, it is well known to locate an adjustable mask in the focal plane F—F. Accordingly, I have shown a variable field mask assembly 20 in the finder system at this point and it is this mask assembly and its use, in combination with the remainder of the finder system, which constitutes the present invention and will now be described.

In the preferred embodiment of my invention, the mask assembly is to provide various field sizes in the finder for use with a series of six interchangeable objectives available for the camera, i. e., 15-mm., 25-mm., 40-mm., 63-mm., 102-mm. and 152-mm. objectives. Accordingly, it comprises a pair of hexagonal plates 21 and 22 which are held in spaced parallel relation by six posts 23, one located at each of the corners of the plates. The frames formed by the inside edges of two adjacent posts 23 and the inside edges of the plates 21 and 22 between them, form the actual or maximum field of the view finder and is the same size on each of the six sides of the mask assembly. In the preferred embodiment of the assembly, the dimensions of the plates and the posts are such that this frame size corresponds to the field of a 15-mm. objective. The proper size masks for the remaining objectives are formed in different ones of the other five sides of the assembly by a wire stretched between the posts and between the plates to form wire masks "M" in each of the frames of the assembly. (See Fig. 5.) The different size wire masks "M" on each side of the hexagonal drum are preferably formed by a single continuous wire "W" which is, in turn, wrapped around and stretched between the posts 23 and the plates 21 and 22, as will now be described. Looking at Figs. 5, 6, and 7, one end 24 of the wire "W" is fastened to one of the posts 23 adjacent the 15-mm. mask. After being wrapped around this post, the wire is then stretched across the frame on one side of the drum to the adjacent post, around which it is wrapped, and is then stretched across the next frame. This procedure is continued from post-to-post until the wire reaches the sixth post where it is looped around a pin 25 extending radially of this post, and is then brought back to the starting post by being successively wrapped around the posts and stretched across the frames between them. When the wire gets back to the first post, at which it started, it is wrapped around a pin 26 thereon and is then drawn downwardly over the edge of the lower plate 22 and up across the 25-mm. frame to the upper plate, then across the top of the upper plate 21 and down across the side of the drum, which is to contain the 63-mm. mask, over the edge of the lower plate 22 and then into-and-out of openings 27 and 27' in the bottom plate spaced apart by an amount corresponding to the width of the 63-mm. field and then again up across the 63-mm. side of the drum and over the top of the plate 21 to the 152-mm. side of the drum where the same procedure is repeated. The path of the wire "W" during winding is indicated in each of Figs. 5 and 6 by small arrows; the wire ends at the bottom of the side of the drum including the 40-mm. mask and is attached by being drawn under a spring washer 28.

It will be understood that the horizontal boundaries of the several masks are formed by the reach of the wire which is stretched between the posts 23. The proper spacing of the horizontal reaches of the wire in the different frames is determined by circumferential grooves 29 in the posts which are engaged by the wire and serve to locate it in proper spaced relation on the posts and to prevent the wire from sliding along the post. The proper spacing of the vertical reaches of the wire across each of the sides of the drum is provided by notches 30 in the corners of upper and lower plates 21 and 22 in combination with the openings 27 and 27' in the lower plate adjacent each side of the drum. These notches 30 also act to prevent the wire from sliding along the inclined edges of the drum.

A piece of opaque film 31, with the objective sizes printed on it, is wrapped around the bottom of the mask drum in proper position to identify the various masks. This film also forms the bottom edge of the actual view finder field and forms the bottom horizontal boundary of the 15-mm. mask. The objective numbers are visible through the eyepiece of the view finder.

This mask assembly 20 is rotatably mounted in the rear end of the view finder in front of the ocular 16. (See Fig. 1.) It is mounted with its axis perpendicular to and intersecting the optic axis of the finder system and is so disposed that, as it is rotated, the different masks are moved successively into the focal plane F—F of the finder system. Since the wire mask on the rear side of the drum is in the focal plane of the image-forming means and the ocular of the finder system, it is the mask on the drum which is operative. The wire mask, diametrically opposite or on the front side of the drum and through which the light must pass, is too far from the focal plane of the ocular to be in focus or even cast a shadow. It will thus be seen that by using my arrangement of parts, the maximum amount of light reaches the eyepiece, even when the longer focal length masks are being used. Furthermore, by using wire masks and the present arrangement of parts, the masks may be placed on the drum in succession, according to size, rather than having to place them at random and in accordance with their non-interference with one another. Also, the use of wire masks in a completely open actual field makes it easier to locate the subject in the longer focal length masks, especially if the subject is a moving one.

I will now describe the method of mounting this mask assembly to the finder casing which I find preferable. As shown in Figs. 3 and 7, the bottom wall 32 of the finder housing, which may be the top wall of the camera, is provided with an upstanding circular support 33. At diametrically opposite points on the top of this support are fixed a pair of supporting pillars 34 so shaped that they do not extend into the actual field of the mask assembly when it is mounted thereon. Resting on the tops of the pillars 34 and fastened thereto by screws 35 is a circular plate 36 having a locating stud 37 extending upwardly from the center thereof. The mask assembly is dropped onto this supporting structure with the underside of its top plate 21 resting on the top of plate 36 and a hole in the center of the top plate 21 engaging locating stud 37 to locate the mask assembly centrally of the supporting structure. The bottom plate 22 of the mask assembly is provided with a circular opening 38 slightly larger than the circular support 33 so that the bottom of the mask assembly can drop slightly below the top of this support. The top of the circular support 33 is provided with serrations 39 to eliminate undesirable reflections of light therefrom.

The mask assembly is rotated in the finder housing to bring different masks into operative position by means of a knob 39 on the top of the finder housing. The drive between the knob 39 and the mask assembly 20 is a frictional one and comprises a shaft 40 to the top of which the knob is keyed and also held by a screw 41. This shaft has a bore 40' to receive the locating stud 37. A drive disk 42 is mounted on the shaft 40 to slide therealong under the action of spring 43 encircling the shaft and is connected to the shaft to rotate therewith by means of a key, or flat, on the shaft. A washer 44 is staked to the end of the shaft to prevent the drive disk from sliding off the end thereof. A frictional drive connection between the disk 42 and the top plate 21 of the mask assembly is provided by two disks 44' of any suitable friction material, i. e., leather, cork, etc. One of these friction disks may be fastened to each of the driving and driven parts.

To accurately locate each of said masks in operative relation in the finder system by feel, a spring detent locating means is provided. This includes a round-ended plunger 45 slidably engaging a bore in one or both of the supporting pillars 34 and which plunger is normally pressed by a spring 46 upwardly into engagement with the lower side of the plate 21. This side of the plate 21 has six circumferentially spaced depressions 47 into different ones of which the end of the plunger is adapted to snap when the mask assembly is positioned with one of the masks in operative position.

While I have shown my mask assembly composed of a pair of plates connected in spaced relation at their corners, it will be appreciated that this supporting structure is, in effect, a hexagonal drum having windows in each side and which windows are the size of the actual field of the finder. Then the wire for making the several masks could be wrapped around the pillars, left at the corners between the windows. Also, the several masks could be formed by two or more wires instead of from one, if desired. For example, one wire could be used for forming the horizontal boundaries of the masks and another could be used to form the vertical boundaries of the mask. Further, instead of having one of the windows or masks formed by the posts and the edges of the plates alone, as in the 15-mm. mask, all of the masks could be made of wire, if desired. It goes without saying that the number of sides which the mask assembly has depends upon the number of objectives which are to be accommodated. If four objectives were to be accommodated, the polygonal drum could be a square, while if eight lenses were to be accommodated, the drum would be an octagon. The only limitation in this respect is that the polygon used as a supporting structure must have an equal number of sides.

Although I have shown and described certain specific embodiments of my invention, I am fully aware that many modifications thereof are possible. My invention therefore is not to be restricted except insofar as is necessitated by the scope of the appended claims.

Having thus described my invention, what I claim is new and desire to secure by Letters Patent of the United States is:

1. In an optical camera view finder the combination with a casing forming a light conduit, optical means in the forward end of said casing for forming an image of the field of view at a given focal plane, an ocular in the rear end of said housing focused on said focal plane, of a variable field mask for adapting said finder for use with camera objectives of different focal length and comprising a polygonal drum having an even number of sides, a rectangular window in each side of said drum at least as large as the size of the field of the shortest focal length objective to be accommodated, means associated with each window defining a field frame of a different size and corresponding to the fields of different camera objectives to be accommodated but permitting light to enter the entire area of said window, means for rotatably mounting said drum in said view finder casing with its axis perpendicular to and intersecting the optic axis of the finder system, said drum so disposed in the casing that only one of its parallel sides and the field frame associated therewith will be in said focal plane of the finder system at any one time, means for rotating said drum to bring different ones of said field frames into said focal plane, and means for indicating which field frame is in said focal plane at any time.

2. The optical camera view finder according to claim 1, in which the window in each side of the drum corresponds to the size of the field of the shortest focal length objective to be accommodated, and all but one of said windows has a different size field frame formed therein, to correspond with the fields of different objectives to be accommodated, by two pairs of parallel horizontal and vertical wires stretched across the windows in perpendicular relationship.

3. The optical camera view finder according to claim 1, in which the means for indicating which field frame is in said focal plane at any time, comprises a support with a legend thereon which is visible in contrast with said support by the action of transmitted light and which support is located in the plane of and adjacent each field frame to be vesible through the ocular.

4. The optical camera view finder according to claim 1, including locating means comprising a spring-loaded detent between the drum and its support for locating the drum with any one of its sides in said focal plane of the finder system.

5. The optical camera view finder according to claim 1 in which said drum is rotatably mounted on a support in said casing, a knob on the outside of said casing for rotating said drum, and a friction clutch between said knob and drum.

6. A multiple field mask for use in a camera view finder adapted to accommodate camera objectives of different focal lengths and comprising a polygonal drum having an even number of sides, a rectangular window in each side of said drum at least as large as the size of the field of the shortest focal length objective to be accommodated, a pair of parallel horizontal and a pair of vertical wires crossing at least all but one window in perpendicular relation to form field frames in each window of a different size and corresponding to the fields of different camera objectives to be accommodated, and a tape in each window adjacent the wire field frame bearing a legend which indicates which focal length lens the associated field frame accommodates and which legend is visible by contrast with the tape by the action of transmitted light.

7. A multiple field mask according to claim 6, in which the drum comprises two polygonal plates held in spaced parallel and symmetrical relation by posts located at the corners of the plates, and in which the horizontal boundaries of each of the wire field frames are formed by a single continuous wire wrapped around and stretched between the posts across each window and located in proper spaced relation by engaging grooves in the posts, and the vertical boundaries of each of the field frames are formed by a continuous wire wrapped around and stretched between the polygonal plates across each window and located in proper spaced relation by engaging grooves in the edges of said plates adjacent each window.

8. A multiple field mask according to claim 6 in which the drum comprises two polygonal plates held in spaced parallel and symmetrical relation by posts located at the corners of the plates, and in which the boundaries of each of the wire field frames are formed from a continuous wire wrapped around and stretched between the posts across each window and wrapped around and stretched between the polygonal plates across each window, the desired spacing between the horizontal wires and vertical wires across each window to determine the desired different size field frames being determined by grooves in the posts and in the plates, respectively, which the wire is adapted to engage.

9. A multiple field mask according to claim 6 in which the rectangular window in each side of said drum has a horizontal dimension corresponding to the field of the shortest focal length objective to be accommodated but has a width slightly greater than the field of said objective, and in which there is no wire field frame in the window associated with said objective, and an opaque tape held in wrapped relation with sides of said drum and located adjacent the bottom edge of each window, said tape including a plurality of transparent legends designating different focal length lenses and spaced therealong to be associated with the field frame corresponding to the legends, and said tape being of such width that its upper edge forms one of the horizontal boundaries of said window without a wire frame and thus produces a field frame corresponding to the shortest focal length lens to be accommodated.

MORRIS E. BROWN.

No references cited.